United States Patent [19]

Di Battista et al.

[11] 4,361,695

[45] Nov. 30, 1982

[54] POLYESTERS OF N,N-DI-ALKANOL-AMINES WITH DI-(HYDROXY-ALKYL-BENZYL) MALONIC ACIDS AND USE THEREOF AS STABILIZERS FOR POLYMERS

[75] Inventors: Piero Di Battista, San Donato Milanese; Giuseppe Nelli, Milan; Francesco Gratani, Sesto San Giovanni, all of Italy

[73] Assignee: Montedison S.p.A., Milan, Italy

[21] Appl. No.: 204,191

[22] Filed: Nov. 5, 1980

[30] Foreign Application Priority Data

Nov. 6, 1979 [IT] Italy ................................ 27059 A/79

[51] Int. Cl.$^3$ .............................................. C08G 69/44
[52] U.S. Cl. .................................... 528/289; 528/176; 528/184; 528/291; 525/177; 525/425; 525/440
[58] Field of Search ............... 528/176, 184, 289, 291; 260/45.8 NP, 45.8 NR, 45.85 P; 525/177, 425, 440

[56] References Cited

U.S. PATENT DOCUMENTS

| | | | |
|---|---|---|---|
| 3,627,725 | 12/1971 | Gilles | 260/45.85 P |
| 3,721,704 | 3/1973 | Dexter | 260/45.85 P X |
| 3,943,106 | 3/1976 | Schmidt et al. | 528/176 X |
| 3,993,655 | 11/1976 | Rasberger et al. | 260/45.8 NP X |
| 4,081,475 | 3/1978 | Spivack | 260/45.85 P X |
| 4,087,404 | 5/1978 | Cook | 260/45.8 NP |

Primary Examiner—Lucille M. Phynes

[57] ABSTRACT

New polyesters of N,N-di-alkanol-amines with di-(hydroxy-alkyl-benzyl) malonic acids are disclosed.

The new polyesters are useful for stabilizing thermoplastic polymers, in particular polyolefins, against sunlight, heat and oxidation.

A process for producing the new polyesters is also disclosed, as well as the polymeric compositions stabilized with said new polyesters.

14 Claims, No Drawings

POLYESTERS OF N,N-DI-ALKANOL-AMINES WITH DI-(HYDROXY-ALKYL-BENZYL) MALONIC ACIDS AND USE THEREOF AS STABILIZERS FOR POLYMERS

THE PRIOR ART

As is known, to improve the thermo- and photo-oxidative stability of the synthetic polymers subject to deterioration, use is generally made of some stabilizing substances, which may be antioxidizers, light stabilizers or mixtures thereof.

Among the various stabilizers proposed for this purpose, the sterically hindered amines are the ones which, under equal concentration, exert a higher stabilizing activity against the degrading action of the oxygen and of the ultraviolet radiations. It is known too, that the stabilizing action of the sterically hindered amines can be improved and extended by the presence of a phenolic group. In such case, in fact, there is a synergistic action between the aminic and the phenolic groups.

THE PRESENT INVENTION

We have now discovered that when the phenolic group in the above sterically hindered amino phenolic stabilizers, is the radical of the di-(hydroxy-alkyl-benzyl) malonic acid, the anti-oxidizing properties of such amino-phenolic compounds are remarkably improved.

The stabilizers exhibiting the improved anti-oxidizing properties are, therefore, the polyesters of N,N-di-alkanol-amines with di-(hydroxy-alkyl-benzyl) malonic acids, having the general formula:

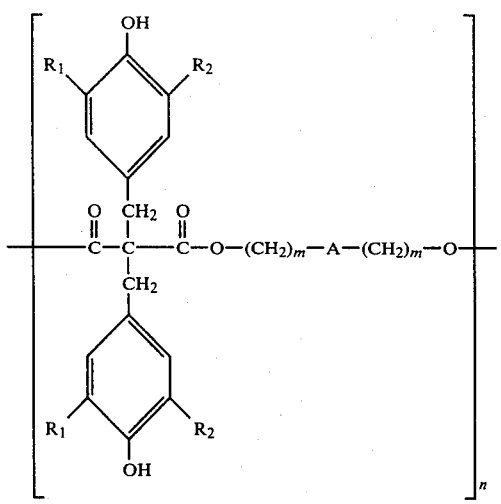

(I)

in which: each of $R_1$ and $R_2$, which may be the same or different, is an alkyl radical having 1 to 6 carbon atoms, an aralkyl radical having 7 to 9 carbon atoms or a cyclo-alkyl radical having 5 to 8 carbon atoms;

A is a nitrogen containing divalent radical selected from the group consisting of:

(a) a radical

in which $R_3$ may be an alkyl radical having 1 to 12 carbon atoms, an aryl radical having 6 to 12 carbon atoms or an alkyl-substituted piperidyl radical of the type:

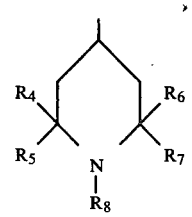

in which: each of $R_4$, $R_5$, $R_6$ and $R_7$, which may be the same or different, is an alkyl radical having 1 to 4 carbon atoms and $R_8$ is hydrogen or an alkyl radical having 1 to 4 carbon atoms;

(b) a radical

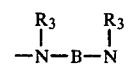

in which $R_3$ has the same meaning specified hereinbefore and B is an alkylene radical having 2 to 12 carbon atoms or a cyclo-alkylene radical having 3 to 12 carbon atoms;

(c) a radical

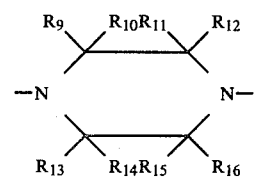

in which: each of $R_9$, $R_{10}$, $R_{11}$, $R_{12}$, $R_{13}$, $R_{14}$, $R_{15}$ and $R_{16}$, which may be the same or different, is hydrogen or an alkyl radical having 1 to 4 carbon atoms, or two by two belong to an aliphatic or aromatic cycle having 5 to 12 carbon atoms; m is an integer from 1 to 12 and n is an integer from 2 to 100.

The present invention provides too, compositions based on thermoplastic synthetic polymers, stabilized to oxidation and to ageing, containing, as a stabilizer, one of the polyesters of N,N-di-alkanol-amines with di-(hydroxy-alkyl-benzyl) malonic acids having general formula (I) indicated hereinbefore, in an amount sufficient to prevent any degrading action.

The term "thermoplastic synthetic polymers", whenever used in the present invention and in the claims, means all thermoplastic polymeric substances usually subjected to degradation due to the action of oxygen, light and heat, when they are exposed to atmospheric agents or to heat treatments both during the processing, transformation and use thereof.

Thermoplastic substances which can be stabilized with the polyesters having general formula (I), according to the present invention, include, for instance:

polyolefins, such as homopolymers of olefins, among which are high and low density polyethylene, polypropylene, polystyrene, polybutadiene, polyisoprene and the like; and copolymers of olefins with other ethylenically unsaturated monomers, such as ethylene-propylene copolymers, ethylene-butene copolymers, styrene-butadiene copolymers, styrene-acrylonitrile copolymers and acrylonitrile-styrene-butadiene copolymers;

polyvinyl chloride and polyvinylidene chloride, including both the homopolymers and copolymers of vinyl chloride and of vinylidene chloride with each other or each of them with vinyl acetate or other ethylenically unsaturated monomers;

polyacetals, such as polyoxymethylene and polyoxyethylene;

polyesters such as polyethylene terephthalates;

polyamides such as nylon 6, nylon 6-6 and nylon 6-10;

polyurethanes;

polycarbonates;

butadiene-styrene copolymers;

natural and synthetic rubbers, etc.

Such synthetic polymers can be used either in the form of powder or granules, or as shaped articles such as, for example, fibers, films, sheets, and other shaped articles or as latexes and foams.

Among the above synthetic polymers, the most suitable ones for being used, according to the present invention, are the polyolefins deriving from monomers having the general formula:

$$R-CH=CH_2$$

where R is an alkyl or aryl radical, or hydrogen. The present preferred polyolefin is polypropylene consisting prevailingly of isotactic macromolecules and obtained by polymerization of propylene in the presence of stereospecific catalyst.

Some examples of polyesters having general formula (I) are:

poly-di-(4-hydroxy-3,5-di-tert.butyl-benzyl)-malonate of N,N-di-ethyl-ter.butyl amine;

poly-di-(4-hydroxy-3,5-di-tert.butyl-benzyl)-malonate of N,N'-di-ethyl-(2,5-methyl)piperazine;

poly-di-(4-hydroxy-3,5-di-tert.butyl-benzyl)-malonate of N,N-di-ethyl-4-(1,2,2,6,6-pentamethyl)piperidylamine;

poly-di-(4-hydroxy-3,5-di-tert.butyl-benzyl)-malonate of N,N'-di-ethyl-N,N'-di-(1,2,2,6,6-pentamethyl-4-piperidyl)hexamethylene diamine;

poly-di-(4-hydroxy-3,5-di-tert.butyl-benzyl)-malonate of N,N-di-ethyl-tert.octylamine;

poly-di-(4-hydroxy-3,5-di-tert.butyl-benzyl)-malonate of N,N'-diethyl-(2,2,3,3,5,5,6,6-octomethyl)piperazine;

poly-di-(4-hydroxy-3,5-di-tert.butyl-benzyl)-malonate of N,N'-di-ethyl-N,N'-di-(2,2,6,6-tetramethyl-4-pyridyl)ethylene diamine;

poly-di-(4-hydroxy-3,5-di-tert.butyl-benzyl)-malonate of N,N-di-butyl-4-(2,2,6,6-tetramethyl)piperidyl amine;

poly-di-(4-hydroxy-3,5-di-tert.butyl-benzyl)-malonate of N,N'-diethyl-7,15-diaza-di-spiro (5,1,5,3)hexadecane.

The polyesters of general formula (I) can be synthesized by polycondensation of a N,N-di-alkanol-amine with di-(hydroxy-alkyl-benzyl)malonic acid or with an ester thereof according to the following scheme:

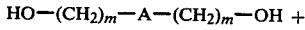

(II)

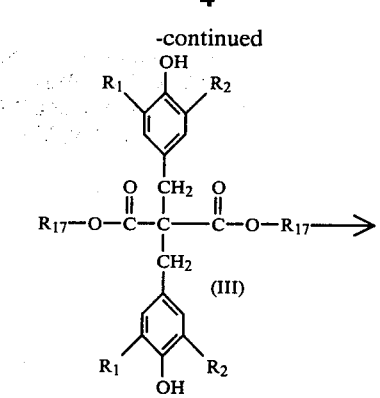

(III)

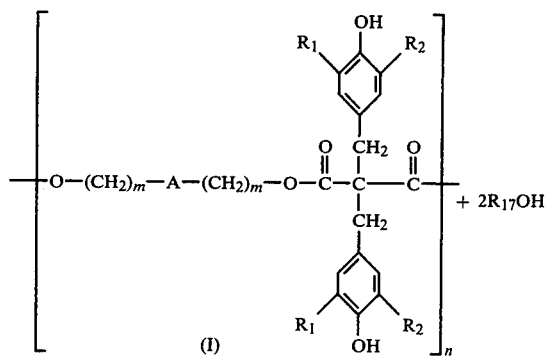

(I)

wherein A, $R_1$ and $R_2$, m and n have the meanings specified hereinbefore and $R_{17}$ is hydrogen or an alkyl radical having 1 to 5 carbon atoms.

Poly-esterification or poly-trans-esterification or polycondensation occurs by heating of the mixture of the two reagents, either in the presence or in the absence of a solvent or of a dispersant.

The alcohol which forms from the reaction is removed by distillation.

The presence of catalysts such as alcoholates of an alkaline metal, lithium hydroxide, di-butyl-tin oxide or the like can facilitate the completion of the reaction.

The resulting polymeric product is generally a water-insoluble white powder.

In practice, mixtures of polymeric chains having a different value of n are obtained. The average value of n in the mixture generally ranges from 4 to 20.

The N,N-di-alkanol-amine having general formula (II) can be preferably synthesized by reacting a primary or secondary amine with ω-halogen alkanols, according to the reaction:

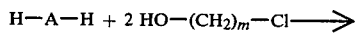

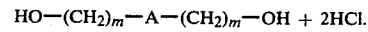

The reaction is carried out in the presence of a base, such as a hydroxide of an alkaline or alkaline-earth metal, a hydride, or an alkoxide of an alkaline metal.

The di(hydroxy-alkyl-benzyl)malonic acid having general formula (III) can be synthesized according to any known process; thus, for example, by reacting a di-alkyl-hydroxy-benzyl amine with an alkyl malonate, in the molar ratio of 2:1, according to the scheme:

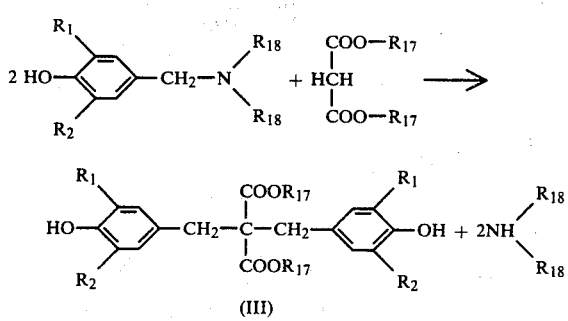

(III)

wherein: $R_1$, $R_2$ and $R_{17}$ have the meanings indicated hereinbefore and $R_{18}$ is an alkyl radical having 1 to 4 carbon atoms. The reaction is carried out in the presence of strong bases derived from an alkaline metal, such as alkoxides, hydrides of sodium or of lithium, etc.

The amount of polyester, having general formula (I), to be added to the thermoplastic synthetic polymer to be stabilized, according to the present invention, is not critical and may vary in a wide range as function of the type, properties and particular uses of the polymer. Generally, said stabilizers can be added to the polymer in amounts ranging from 0.01 to 5.0% by weight, based on the polymer weight; in practice, however, the effective amount varies as a function of the type of polymer to be stabilized. Thus, for example, in the case of polyolefins, an effective amount can range from 0.01 to 2% by weight; in the case of polyvinyl chloride and the polyvinylidene chloride, such amount can range from 0.01 to 1% by weight; while, in the case of polyurethanes and polyamides, such amount may range from 0.01 and 5% by weight.

The stabilizer having general formula (I) can be employed either alone or in admixture with other known additives such as anti-oxidizers, ultraviolet ray absorbers, pigments, fillers, basic nitrogen containing polycondensates, other stabilizers, etc. Some examples of such additives are oxybenzotriazoles, oxybenzophenones, Ni-stabilizers, metal soaps, phenolic antioxidants, phosphites, thioesters, hydroquinone derivatives, triazine compounds, acrylamino-phenols, benzyl-phosphonates, etc. Such additives can be used along with the compounds having general formula (I), according to the present invention, in a ratio by weight ranging from 0.5:1 to 3:1.

The polyesters of general formula (I) or the mixture containing said polyesters can be incorporated into the synthetic polymer according to any known procedure and at any stage prior to or during the manufacture of the shaped articles from the polymer. Thus, for example, it is possible to effect a simple admixing of the additives in powder form, under stirring, to the polymer; or the polymer can be mixed with a solution of the stabilizers in a suitable solvent, which is then evaporated; or the stabilizers can be added to the polymer at the end of polymerization. Furthermore it is possible to get the stabilizing action by applying the stabilizer on the manufactured article, for example by dipping it into a solution or dispersion of the stabilizer and then by evaporating the solvent or the dispersant.

The following non-limiting examples are given for a more detailed understanding of the present invention and for further enabling those skilled in the art to practice the same. In the examples, all the parts are given by weight, unless otherwise specified.

EXAMPLE 1

Preparation of di-(4-hydroxy-3,5-di-tert.butyl-benzyl)malonate of N,N-diethyl-4-(2,2,6,6-tetramethyl)piperidyl-amine.

A mixture consisting of 7.3 g of N,N-di-hydroxyethyl-4-(2,2,6,6-tetramethyl)piperidyl-amine and of 18 g of di-(4-hydroxy-3,5-di-tert.butyl-benzyl)diethyl malonate was charged to a reactor equipped with a stirrer and connected with a vacuum pump. After having repeatedly deaerated the reactor by means of nitrogen, the mixture was molten in a nitrogen atmosphere. 0.3 of anhydrous lithium hydrate were added to the mixture, whereupon it was stirred for 1 hour at 160° C. and at ambient pressure. The reaction mixture was kept, at a temperature of 160° C., for a further hour at a pressure of 500 torr and for two further hours at 20 torr. The ethyl alcohol resulting from the reaction was removed by distillation.

The reaction mixture was dissolved in hexane and the solution was neutralized with acetic acid, decolored by decoloring earth and filtered. From the filtered solution, a light yellow powder, having a melting point of 62°–65° C. was crystallized, by cooling to 0° C.

On the basis of the elemental analysis and of the nuclear magnetic resonance (N.M.R.) spectrum, to the compound was attributed the following structural formula:

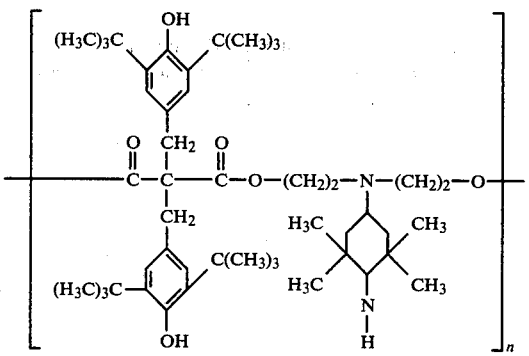

The molecular weight of the product, determined by the osmometric method, was corresponding to an average n of 12.

EXAMPLE 2

Preparation of poly-di-(4-hydroxy-3,5-di-tert.butyl-benzyl)malonate of N,N-di-ethyl-tert.butyl amine.

It was operated according to the modalities of example 1, using a mixture of di-(4-hydroxy-3,5-di-tert.-butyl)benzyl di-ethyl malonate and of N,N-di-hydroxyethyl-tert.butyl amine, in equimolecular amounts. The reaction was carried out in the presence of lithium hydroxide.

The resulting product was crystallized from hexane and appeared in the form of a white powder having a melting point of 67°–70° C. On the basis of the elemental analysis and of the N.M.R. spectrum, the following structural formula was attributed to the obtained product:

90°–115° C. The elemental analysis and the N.M.R. spectrum, correspond to the compound:

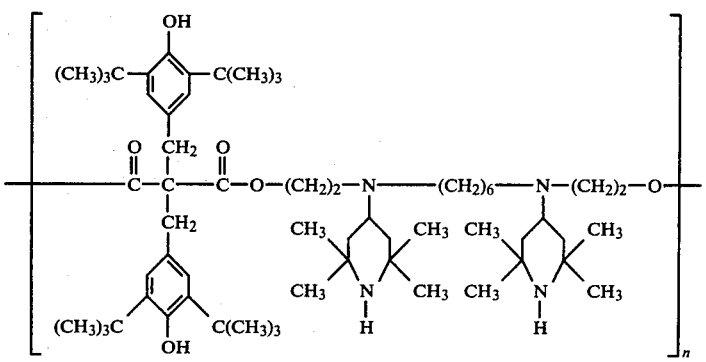

wherein the average value of n, determined on the basis of the molecular weight, measured according to the osmometric method, was equal to 15.

EXAMPLE 4

Preparation of poly-(4-hydroxy-3,5-di-tert.butyl-benzyl)malonate of N,N'-di-ethyl-(2,2,5,5-tetramethyl)-piperazine.

By operating according to example 1, di-(4-hydroxy-3,5-di-tert.butyl-benzyl)diethyl malonate were reacted with an equimolar amount of N,N'-di-hydroxy-ethyl-(2,2,5,5-tetramethyl)piperazine. The reaction was carried out in the presence of lithium hydroxide.

The reaction product, crystallized from hexane, was a light yellow powder having a melting point of 110°–120° C. The elemental analysis and the N.M.R. spectrum, correspond to the compound:

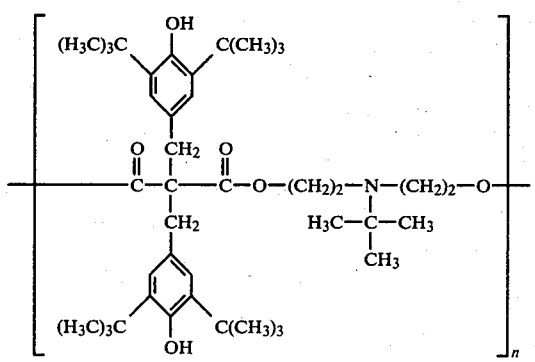

The molecular weight of the product, determined according to the osmometric method, was corresponding to an average value of n equal to 8.

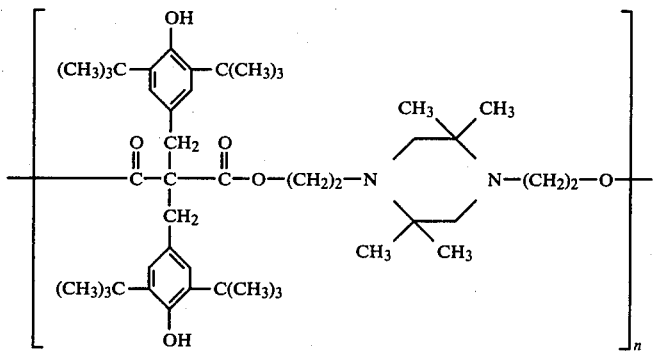

wherein the average value of n, determined on the basis of the molecular weight, measured according to the osmometric method, was equal to 20.

STABILIZATION TESTS 200 ccs of chloroform containing dissolved therein one of the polyesters of examples 1 to 4, in amounts as indicated in the Table, were added to 300 g of non-stabilized polypropylene, having an intrinsic viscosity, measured in tetralin at 130° C., of 162 cc/g, a residue, after the extraction of the crude polymerizate with n-heptane, of 96.5% and an ash content of 80 ppm.

Each mixture was stirred for about 6 hours at room temperature in a rotary evaporator and then dried at 50° C., at 0.01 mm of Hg for 1 hour. The additioned powder

EXAMPLE 3

Preparation of poly-(4-hydroxy-3,5-di-tert.butyl-benzyl)malonate of N,N'-di-ethyl-N,N'-bis-(2,2,6,6-tetramethyl-4-piperidyl)-hexamethylene diamine.

It was operated according to the modalities of example 1, using a mixture consisting of di-(4-hydroxy-3,5-di-tert.butyl-benzyl) di-ethyl malonate and of N,N'-di-hydroxy-ethyl-N,N'-bis-(2,2, 6,6-tetramethyl-4-piperidyl)hexamethylene diamine, in equimolar amounts. The reaction was carried out in the presence of lithium hydroxide.

The reaction product, crystallized from hexane, was a light yellow powder having a melting point of so obtained was extruded in a Brabender extruder at 220° C. and granulated.

The granules were transformed into films and small plates at 200° C., for 3 minutes, by compression between two square steel plates measuring 20 cm×20 cm, under a load of 1000 kg. The films so obtained exhibited an uniform thickness of 50-60 microns and the small plates a thickness of 1 mm and were practically colorless and homogeneous.

On the test pieces so prepared the thermo-oxidative stability was determined by measuring the induction period (IP) on the films, the resistance to ageing in an oven (T.I.) on the small plates, and the photo-oxidative stability by exposure to Xenotest.

As induction period (IP) of the thermo-oxidation at 170° C. and 760 mm of Hg of oxygen, was considered the time required for getting a quick increase of the oxygen absorption rate.

As resistance to ageing in an oven (T.I.), was considered the time required to evidence, at naked eye, on the examined test plate, any cracks or chalking of the surface and other modifications of the same, after exposure of the test piece in an oven at 150° C. in an air stream.

As photo-oxidative stability, the embrittlement time was measured. As embrittlement time was considered the time required to cause the rupture of the film by only one bending at 180° C., after exposure to Xenotest 1200 under the following operative conditions:
temperature of the black panel: 45° C.;
relative humidity: 50%;
alternate exposure to the maximum ultraviolet intensity of the apparatus.

To determine the induction period (IP) of thermo-oxidation, 0.2 g of the abovesaid film were cut into pieces and introduced into a cell of about 50 cm³, in which an oxygen atmosphere was created by repeatedly removing and introducing oxygen. The cell was connected with an oxygen absorption measuring device, equipped with recording device of the absorbed volumes. The cell was dipped into a thermostatic bath maintained at a temperature of 170° C.

The values of the induction period (IP) of the embrittlement time (T.I.) in an oven and of the embrittlement time to Xenotest are recorded in the following Table.

TABLE

| Stabilizer | | Thermo-oxidative stability | | Photo-oxidative stability |
|---|---|---|---|---|
| Example No. | % by weight | IP in hours | Embrittl. time in h | Embrittlement time in hours |
| — | — | 0 | 24 | 60 |
| 1 | 0.5 | 21.5 | 450 | 360 |
| 2 | 0.5 | 7.5 | 480 | 250 |
| 3 | 0.5 | 15.4 | 610 | 335 |
| 4 | 0.5 | 13.6 | 760 | 130 |

What we claim is:
1. Polyesters of N,N-di-alkanol-amines with di-(hydroxy-alkyl-benzyl)malonic acids, having the general formula:

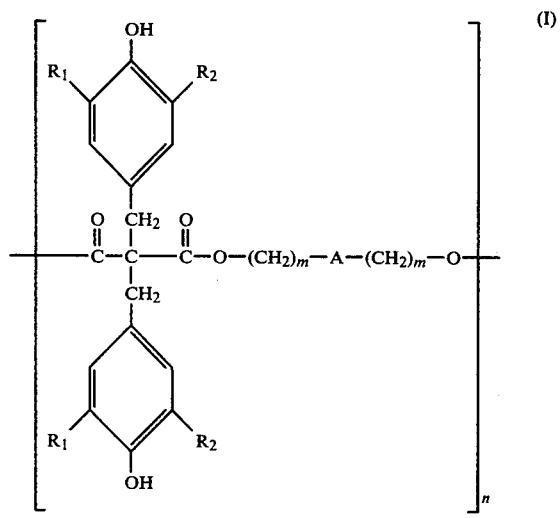

wherein: each of $R_1$ and $R_2$, which may be the same or different, is an alkyl radical having 1 to 6 carbon atoms, an aralkyl radical having 7 to 9 carbon atoms or a cycloalkyl radical having 5 to 8 carbon atoms; A is a nitrogen containing divalent radical selected from the group consisting of:
(a) a radical

in which $R_3$ may be an alkyl radical having 1 to 12 carbon atoms, an aryl radical having 6 to 12 carbon atoms or an alkyl-substituted piperidyl radical of the type:

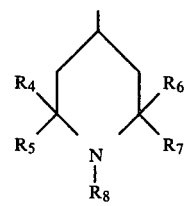

wherein: each of $R_4$, $R_5$, $R_6$ and $R_7$, which may be the same or different, is an alkyl radical having 1 to 4 carbon atoms, and $R_8$ is hydrogen or an alkyl radical having 1 to 4 carbon atoms;
(b) a radical

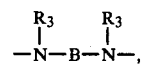

wherein $R_3$ has the same meaning specified hereinbefore and B is an alkylene radical having 2 to 12 carbon atoms or a cyclo-alkylene radical having 3 to 12 carbon atoms;
(c) a radical

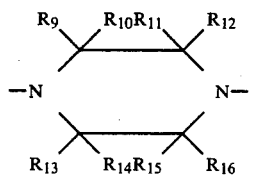

wherein: each of $R_9$, $R_{10}$, $R_{11}$, $R_{12}$, $R_{13}$, $R_{14}$, $R_{15}$ and $R_{16}$, which may the same or different is hydrogen or an alkyl radical having 1 to 4 carbon atoms, or two by two belong to an aliphatic or aromatic cycle having 5 to 12 carbon atoms;
m is an integer from 1 to 12 and
n is an integer from 2 to 100.

2. Polyesters of N,N-di-alkanol-amines with di-(hydroxy-alkyl-benzyl)malonic acids, having general formula (I), according to claim 1, characterized in that the average value of n ranges from 4 to 20.

3. Compositions of thermoplastic synthetic polymers, stabilized to oxidation and to ageing, having incorporated therein, in an amount sufficient to prevent any degradation of the polymer, a polyester of a N,N-di-alkanol amine with a di-(hydroxy-alkyl-benzyl)malonic acid, having the general formula:

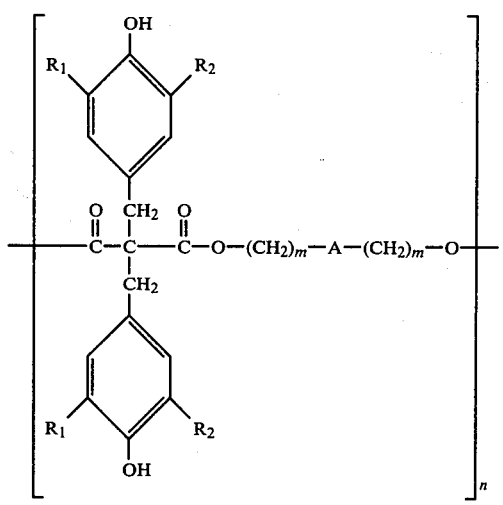

wherein: each of $R_1$ and $R_2$, which may be the same or different, is an alkyl radical having 1 to 6 carbon atoms, an aralkyl radical having 7 to 9 carbon atoms or a cycloalkyl radical having 5 to 8 carbon atoms; A is a nitrogen containing divalent radical selected from the group consisting of:
(a) a radical

in which $R_3$ may be an alkyl radical having 1 to 12 carbon atoms, an aryl radical having 6 to 12 carbon atoms, or an alkyl-substituted piperidyl radical of the type:

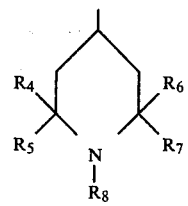

wherein: each of $R_4$, $R_5$, $R_6$ and $R_7$, which may be the same or different, is an alkyl radical having 1 to 4 carbon atoms, and $R_8$ is hydrogen or an alkyl radical having 1 to 4 carbon atoms;
(b) a radical

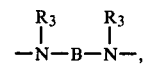

wherein $R_3$ has the same meaning specified hereinbefore and B is an alkylene radical having 2 to 12 carbon atoms or a cyclo-alkylene radical having 3 to 12 carbon atoms;
(c) a radical

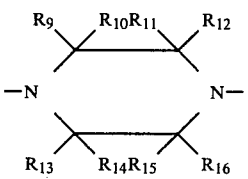

wherein: each of $R_9$, $R_{10}$, $R_{11}$, $R_{12}$, $R_{13}$, $R_{14}$, $R_{15}$ and $R_{16}$, which may be the same or different, is hydrogen or an alkyl radical having 1 to 4 carbon atoms, or two by two belong to an aliphatic or aromatic cycle having 5 to 12 carbon atoms;
m is an integer from 1 to 12 and
n is an integer from 2 to 100.

4. Compositions according to claim 3, in which the polyester having general formula (I) is present in an amount ranging from 0.01 to 5% on the weight of the polymer.

5. Compositions according to claim 3, in which the thermoplastic synthetic polymer is a polyolefin.

6. Compositions according to claim 5, in which the polyolefin is polypropylene consisting prevailingly of isotactic macromolecules.

7. Compositions according to claim 5, in which the polyester having general formula (I) is present in an amount ranging from 0.01 to 2% by weight on the weight of the polyolefin.

8. Compositions according to the preceding claim 3, in which the thermoplastic synthetic polymer is polyvinyl chloride or polyvinylidene chloride.

9. Compositions according to claim 8, in which the polyester having general formula (I) is present in an amount ranging from 0.01 to 1% by weight on the weight of the polymer.

10. Compositions according to the preceding claim 3, in which the thermoplastic synthetic polymer is a polyurethane or a polyamide.

11. Compositions according to claim 10, in which the polyester having general formula (I) is present in an amount ranging from 0.01 to 5% by weight on the weight of the polymer.

12. Compositions according to claim 3, in which the polyester having general formula (I) is employed in admixture with at least one adjuvant.

13. Compositions according to claim 12, in which the adjuvants are selected from the group consisting of antioxidants, ultraviolet ray absorbers, pigments, fillers, basic nitrogen containing polycondensates and auxiliary stabilizers.

14. Compositions according to claim 12, in which the ratio by weight of adjuvant or adjuvants to the polyester having general formula (I) is from 0.5:1 to 3:1.

* * * * *